March 28, 1944.  L. A. MACKLANBURG  2,345,273

WEATHER STRIP

Filed Feb. 20, 1942

Louis A. Macklanburg
INVENTOR

BY Bernard P. Miller
ATTORNEY

Patented Mar. 28, 1944

2,345,273

UNITED STATES PATENT OFFICE 2,345,273

WEATHER STRIP

Louis A. Macklanburg, Oklahoma City, Okla.

Application February 20, 1942, Serial No. 431,723

9 Claims. (Cl. 20—69)

My invention relates to weather strip for sealing between window sashes and window frames.

The prime object of the present invention is the provision of a weather strip for the purposes described, and which is so designed that it may be extruded out of plastic materials.

So far as this inventor knows, or has been able to ascertain, present day weather stripping is almost exclusively formed by rolling sheet material such as copper alloy or steel into desired shapes. With the present shortage of such metals, due to war effort, it is almost mandatory that some other expedient be found for reaching the desired sealing effect without the use of sheet metals. Within this end in view, I have discovered that certain weather strip shapes may be successfully extruded, and when so formed, the strip will retain a requisite amount of its inherent resiliency to obtain the desired sealing result.

My experiments have shown that plastic materials such as Ethocel, Lumarith, Tenite #2, and other similar products are practical for my purposes.

In sheet metal weather strips of rolled configuration, it has not, in most cases, been found practical to form a detent portion of the strip integrally with the sealing portion of the same. By resorting to extrusion instead of rolling, I am able to integrally form the detent and sealing portions of all forms of my strip in a single operation.

It is therefore an important object of the present invention to design an extruded weather strip which includes integrally formed sealing and detent portions.

Another object of the present invention is the provision of a weather strip which is so designed that a sliding window sash will ride upon a substantial portion of the strip instead of against the side plates of the window frame.

Other purposes will be apparent from the following description when taken in connection with the accompanying one-sheet drawing, wherein.

Like characters of reference designate like parts in all of the figures wherein they appear.

In the drawing.

Figure 1:
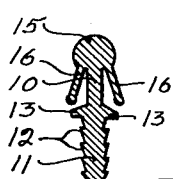
Figure 1 is a transverse sectional view of one embodiment of my extruded weather strip, the sealing elements thereof being shown in their normal or expanded positions.

The reference numerals 1 indicate a side sill or plate of a usual window frame to which is nailed or otherwise rigidly attached a usual blind stop strip 2 and a parting stop strip 3 which is spaced therefrom to form a usual sash channel 4. A usual sash member 5 is slidably disposed in the channel 4 in a conventional manner, and the member 5 is longitudinally grooved superficially as indicated at 6 to receive my weather strip.

The structure thus far numerically described is old and usual to window and window sash mounting practices, and the window frame and sash structure is not a part of the present invention.

The weather strip of Figures 1, 2, 3 and 4 consists substantially of an elongated body portion 10 of sufficient thickness and strength to be substantially rigid when the strip is once installed as will be described hereinbelow. Formed integrally and co-extensive with the body portion 10, is a detent portion 11 having a plurality of outwardly projecting serrations or ribs 12 extending throughout the length thereof. Intermediate the portions 10 and 11 there are provided two oppositely disposed outwardly extending flanges 13 which act as stops to limit the extent to which the detent portion 11 may be inserted into a groove 14 in the sill 1 of the window frame. The flanges 13 extend throughout the entire length of the body 10 and detent 11, and their function is clearly illustrated in Figure 2 of the drawing.

Figure 2:
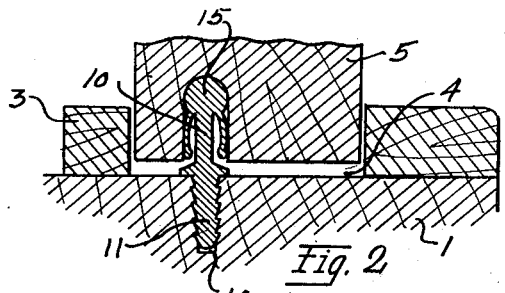
Figure 2 is a similar view showing the strip of Figure 1 operatively installed.

The free edge of the body portion 10 is provided with a co-extensive arcuate surfaced integral bead 15 which is substantially as wide as the span of the flanges 13, and the bead 15 carries two resilient sealing wings 16 which are co-extensive therewith. The wings 16 normally project outwardly from the body portion 10, but when the weather strip is once operatively installed, as illustrated in Figure 2, the wings, due to their resiliency, may be slightly collapsed toward the body portion 10 by their contact with the sides of the groove 6 in the sash member 5. The inherent resiliency of the wings 16 causes them to press outwardly into sealing engagement with the sides of the groove 6 and they thereby exclude ingress of the natural elements such as rain, wind, etc.

In the present embodiment, the wings 16 may be collapsed inwardly to the extent that they will lie flatly against the sides of the body portion 10, and when so positioned they lie within the confines of the flanges 13 and the bead 15. A plurality of these weather strips may therefore be bound tightly together when packaged for shipment to obtain a compact parcel.

Figures 5, 6:
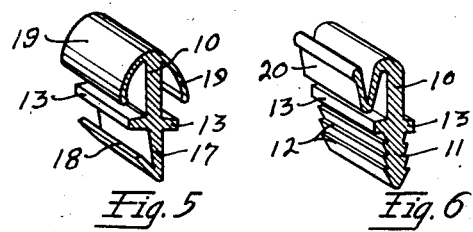

In the embodiment of Figure 5, the body portion 10 and the flanges 13 are identical with the weather strip of Figure 1, but the detent consists of a plane surfaced portion 17 having a co-extensive spur 18 for engagement within the groove 14 of the sill 1. The spur 18 normally extends outwardly from the detent portion 17 at an acute angle, so that its edge portion will resiliently engage the side wall of the groove 14 to maintain the strip therein. In this embodiment the bead 15 of Figure 1 has been eliminated, and outwardly extending arcuate sealing wings 19 have been provided directly upon the body 10 in lieu of the straight sealing wings 16 of Figure 1. This embodiment will not package as compactly as the embodiment of Figure 1, but is practical from the standpoint of sealing efficiency.

In the embodiment depicted in Figure 6, the body portion 10, the detent portion 11, and the stop flanges 13 are identical with those of Figure 1, but in lieu of the bead 15 and wings 16, there has been provided a single sealing wing 20. The wing 20 has a reverse bend which makes it capable of spanning a greater distance than the wings 16 of Figure 1. If desired, another one of the sealing wings 20 may be provided upon the opposite side of the body portion 10.

Figure 7:
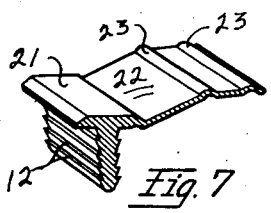
Figure 8:
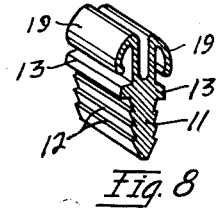

In the embodiment shown in Figure 7, there is provided a substantially flat body portion 21 with which the detent portion 11 is made integral. One side edge of the body portion 21 is extended outwardly to form a resilient sealing wing 22 which is formed to include spaced bearing ribs 23. The wing 22 of this embodiment gives additional riding surface for the sash member 5, and its natural resiliency insures a proper sealing effect.

Figure 9:
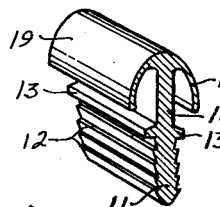
Figures 5, 6, 7, 8 and 9 are perspective views, partially in section, of five different embodiments of my weather strip.

The embodiment shown in Figure 9 is identical with that of Figure 5 except that the detent 11 of Figure 1 is used instead of the detent 17 with its spur 18.

Figure 10:
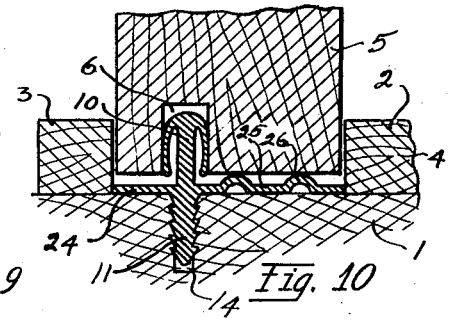
Figure 10 is a transverse sectional view of another embodiment of the strip operatively installed in a window frame; and, Figures 11, 12 and 13 are perspective views, partially in section, showing three additional embodiments of my invention.

Figure 10 illustrates an embodiment of the weather strip which is identical with the embodiment of Figure 9, except that the stop flanges 13 of Figure 9 have been outwardly extended, one to form a flat plate 24 and the other to form an auxiliary sealing wing 25 having integral ribs 26 similar to the ribs 23 of Figure 7. The wing 25 acts in the same manner as the wing 22 of Figure 7.

Figure 11:
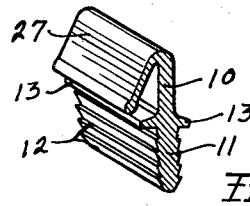
Figures 3, 4:
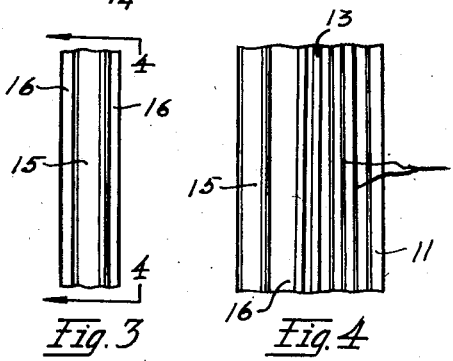
Figure 3 is a fragmentary top view of the strip of Figure 1.
Figure 4 is a side view of the strip, looking from the line 4—4 of Figure 3 in the direction indicated by the arrows.

In Figure 11 is shown an embodiment of the invention wherein the body portion 10, detent portion 11, and the flanges 13 are identical with the embodiment of Figure 6 except, that the reversely bent wing 20 of Figure 6 has been supplanted by a single unidirectional sealing wing 27 somewhat similar to one of the wings 16 of Figure 1.

Figure 12:
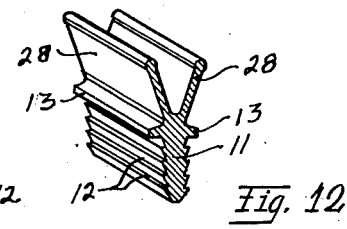

Figure 12 shows an embodiment wherein the body portion 10 has been eliminated and the detent portion 11 and flanges 13 are instead made integral with two converging sealing wings 28 which combine to substantially form a V. The wings 28 of this embodiment may be compressed toward each other to permit their entry into the sash groove 6 in an obvious manner.

Figure 13:
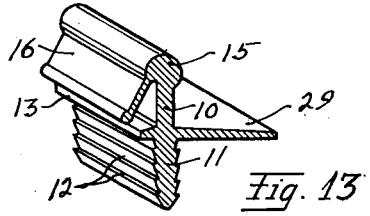

In Figure 13 is illustrated an embodiment wherein one sealing wing 16 of Figure 1 has been eliminated, and wherein one of the stop flanges 13 thereof has been extended to form a riding plate 29 for the sash. The plate 29 may, if desired, be provided with one or more longitudinally extending ribs, not shown, but similar in nature to the ribs 26 of Figure 10 or to the ribs 23 of Figure 7.

I claim:

1. An extruded weather strip for sealing between adjacent faces of a window frame and a sliding window sash, said strip including the following continuous integral parts: a detent portion having a plurality of longitudinally extending laterally projecting ribs, said detent portion adapted to be pressed into a groove in one of said faces and the ribs adapted to frictionally engage a side wall of said groove; a rigid body portion co-extensive with said detent portion; and a resilient wing portion attached to the body portion and extending in a lateral direction from the same for sealing engagement with the other of said faces.

2. An extruded weather strip for sealing between adjacent faces of a window frame and a sliding window sash, said strip including the following continous integral parts: a detent portion having a plurality of longitudinally extending laterally projecting ribs, said detent portion adapted to be pressed into a groove in one of said faces and the ribs adapted to frictionally engage a side wall of said groove; means for limiting the distance to which said detent portion may extend into said groove; a rigid body portion co-extensive with said detent portion; and a resilient wing portion attached to the body portion and extending in a lateral direction from the same for sealing engagement with the other of said faces.

3. An extruded weather strip for sealing between adjacent faces of a window frame and a sliding window sash therein, said strip including the following continuous integral parts: a detent portion having a plurality of longitudinally extending laterally projecting ribs, said detent portion adapted to be pressed into a groove in one of said faces and the ribs adapted to frictionally engage a side wall of said groove; a rigid body portion in alignment with said detent portion and adapted to extend into a groove in the other of said faces; and a resilient wing portion attached to and extending laterally from said body portion for sealing engagement with a side wall of the latter groove.

4. An extruded weather strip for sealing between adjacent faces of a window frame and a sliding window sash therein, said strip including the following continuous integral parts: a detent portion having a plurality of longitudinally extending laterally projecting ribs, said detent portion adapted to be pressed into a groove in one of said faces and the ribs adapted to frictionally engage a side wall of said groove; means for limiting the distance to which said detent portion may extend into said groove; a rigid body portion in alignment with said detent portion and adapted to extend into a groove in the other of said faces; and a resilient wing portion attached to and extending laterally from said body portion for sealing engagement with a side wall of the latter groove.

5. An extruded weather strip for sealing between adjacent faces of a window frame and a sliding window sash therein, said strip including the following continuous integral parts: a detent portion having a plurality of longitudinally extending laterally projecting ribs, said detent portion adapted to be pressed into a groove in one of said faces and the ribs adapted to frictionally engage a side wall of said groove; a rigid body portion in alignment with said detent portion and adapted to extend into a groove in the other of said faces; a resilient wing portion extending laterally from said body portion for sealing engagement with a side wall of the latter groove; and a laterally extending plate portion between the detent and body portions for limiting the distance to which said detent portion may extend into its groove.

6. Organization as described in claim 5, in which the plate portion is resilient, and is longitudinally corrugated to form a seal between said two faces.

7. The combination with a window frame having a longitudinally extending superficial groove in its inner surface, and with a window sash slidably mounted in said frame and having a superficial longitudinally extending groove in its outer surface, said sash groove coinciding with the groove in the frame, of a weather strip for disposition in one of said grooves for sealing with the other groove, including the following continuous integral parts: a rigid detent portion having a plurality of longitudinally extending laterally projecting resilient ribs, said detent portion adapted to be pressed into one of said grooves and to be held therein by frictional engagement of the ribs with the walls of the groove; a rigid body portion co-extensive with said detent portion; and a resilient wing portion located in the other of said grooves and extending in a lateral direction from the body portion for sealing with a wall of said other groove.

8. The combination with a window frame having a longitudinally extending superficial groove in its inner surface, and with a window sash slidably mounted in said frame and having a superficial longitudinally extending groove in its outer surface, said sash groove coinciding with the groove in the frame, of an extruded weather strip for disposition in one of said grooves for sealing with the other groove, including the following continuous integral parts: a rigid detent portion having a plurality of longitudinally extending laterally projecting resilient ribs, said detent portion adapted to be pressed into one of said grooves and to be held therein by frictional engagement of the ribs with the walls of the groove; a rigid body portion co-extensive with said detent portion; and a resilient wing portion located in the other of said grooves and extending in a lateral direction from the body portion for sealing with a wall of said other groove.

9. A weather strip for sealing between adjacent faces of a window frame and a sliding window sash, said strip including the following continuous integral parts: a rigid detent portion having a plurality of longitudinally extending laterally projecting ribs, said detent portion adapted to be pressed into a groove in one of said faces and the ribs adapted to frictionally engage a side wall of said groove; a rigid body portion co-extensive with said detent portion; and a resilient wing portion attached to the body portion and extending in a lateral direction from the same for sealing engagement with the other of said faces.

LOUIS A. MACKLANBURG.